US009553772B2

(12) United States Patent
Dasgupta et al.

(10) Patent No.: US 9,553,772 B2
(45) Date of Patent: Jan. 24, 2017

(54) DYNAMICALLY DETERMINING NODE LOCATIONS TO APPLY LEARNING MACHINE BASED NETWORK PERFORMANCE IMPROVEMENT

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 775 days.

(21) Appl. No.: 13/946,227

(22) Filed: Jul. 19, 2013

(65) Prior Publication Data
US 2014/0222983 A1     Aug. 7, 2014

Related U.S. Application Data

(60) Provisional application No. 61/761,111, filed on Feb. 5, 2013.

(51) Int. Cl.
*G06F 15/173* (2006.01)
*H04L 12/24* (2006.01)
*H04L 12/26* (2006.01)

(52) U.S. Cl.
CPC .......... *H04L 41/16* (2013.01); *H04L 41/0677* (2013.01); *H04L 43/10* (2013.01)

(58) Field of Classification Search
CPC ....... H04L 41/16; H04L 41/0677; H04L 43/10

USPC ................................................ 709/223, 224
See application file for complete search history.

(56) References Cited

U.S. PATENT DOCUMENTS

| 2005/0208952 | A1 | 9/2005 | Dietrich et al. |
| 2005/0261004 | A1 | 11/2005 | Dietrich et al. |
| 2008/0004042 | A1 | 1/2008 | Dietrich et al. |
| 2008/0112372 | A1 | 5/2008 | Thomson et al. |
| 2008/0123586 | A1* | 5/2008 | Manser .................. H04L 41/12 370/328 |
| 2011/0183688 | A1 | 7/2011 | Dietrich et al. |

(Continued)

OTHER PUBLICATIONS

Dasgupta, et al., "Dynamically Determining Node Locations to Apply Learning Machine Based Network Performance Improvement", U.S. Provisional U.S. Appl. No. 61/761,111, filed Feb. 2013, 25 pages, U.S. Patent and Trademark Office.

(Continued)

*Primary Examiner* — Wing F Chan
*Assistant Examiner* — Joseph Maniwang
(74) *Attorney, Agent, or Firm* — Parker Ibrahim & Berg LLC; James M. Behmke; Stephen D. LeBarron

(57) ABSTRACT

In one embodiment, techniques are shown and described relating to dynamically determining node locations to apply learning machine based network performance improvement. In particular, a degree of significance of nodes in a network, respectively, is calculated based on one or more significance factors. One or more significant nodes are then determined based on the calculated degree of significance. Additionally, a nodal region in the network of deteriorated network health is determined, and the nodal region of deteriorated network health is correlated with a significant node of the one or more significant nodes.

21 Claims, 5 Drawing Sheets

(56) References Cited

U.S. PATENT DOCUMENTS

2013/0163471 A1\* 6/2013 Indukuri ............... G06Q 10/00
  370/255
2014/0019092 A1\* 1/2014 Phelps ............... G05B 23/0245
  702/185

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

Akbulut, et al., "Energy and Distance Factor Based Routing Protocol for Wireless Sensor Networks Using Mobile Agents", 5th IEEE International Conference on Recent Advances in Space Technologies, Jun. 2011, pp. 399-402, Istanbul, Turkey.

Chun-Mei, et al., "Research on the Critical Nodes Compensation Algorithm in Sparse Ad Hoc Wireless Networks", 8th IEEE International Conference on Dependable, Automatic and Secure Computing, Dec. 2009, pp. 359-363, Piscataway, NJ.

Finnie, et al., "Notification of Transmittal of the International Search Report and the Written Opinion of the International Searching Authority, or the Declaration", Patent Cooperation Treaty, PCT/US2014/014703, 12 pages, mailed Apr. 30, 2014, European Patent Office, Rijswijk, Netherlands.

Liu, et al., "Connectivity-Based and Boundary-Free Skeleton Extraction in Sensor Networks", 32nd IEEE International Conference on Distributed Computing Systems (ICDCS), Jun. 2012, pp. 52-61, Macau, China.

Vaidya, et al., "Efficient Failure Recovery in Wireless Sensor Networks through Active Spare Designation", 6th IEEE International Conference on Distributed Computing in Sensor Systems Workshops (DCOSSW), Jun. 2010, 6 pages, Piscataway, NJ.

\* cited by examiner

DYNAMICALLY DETERMINING NODE LOCATIONS TO APPLY LEARNING MACHINE BASED NETWORK PERFORMANCE IMPROVEMENT

RELATED APPLICATION

The present invention claims priority to U.S. Provisional Application Ser. No. 61/761,111, filed Feb. 5, 2013, entitled "DYNAMICALLY DETERMINING NODE LOCATIONS TO APPLY LEARNING MACHINE BASED NETWORK PERFORMANCE IMPROVEMENT", by Dasgupta, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. is The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost is function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
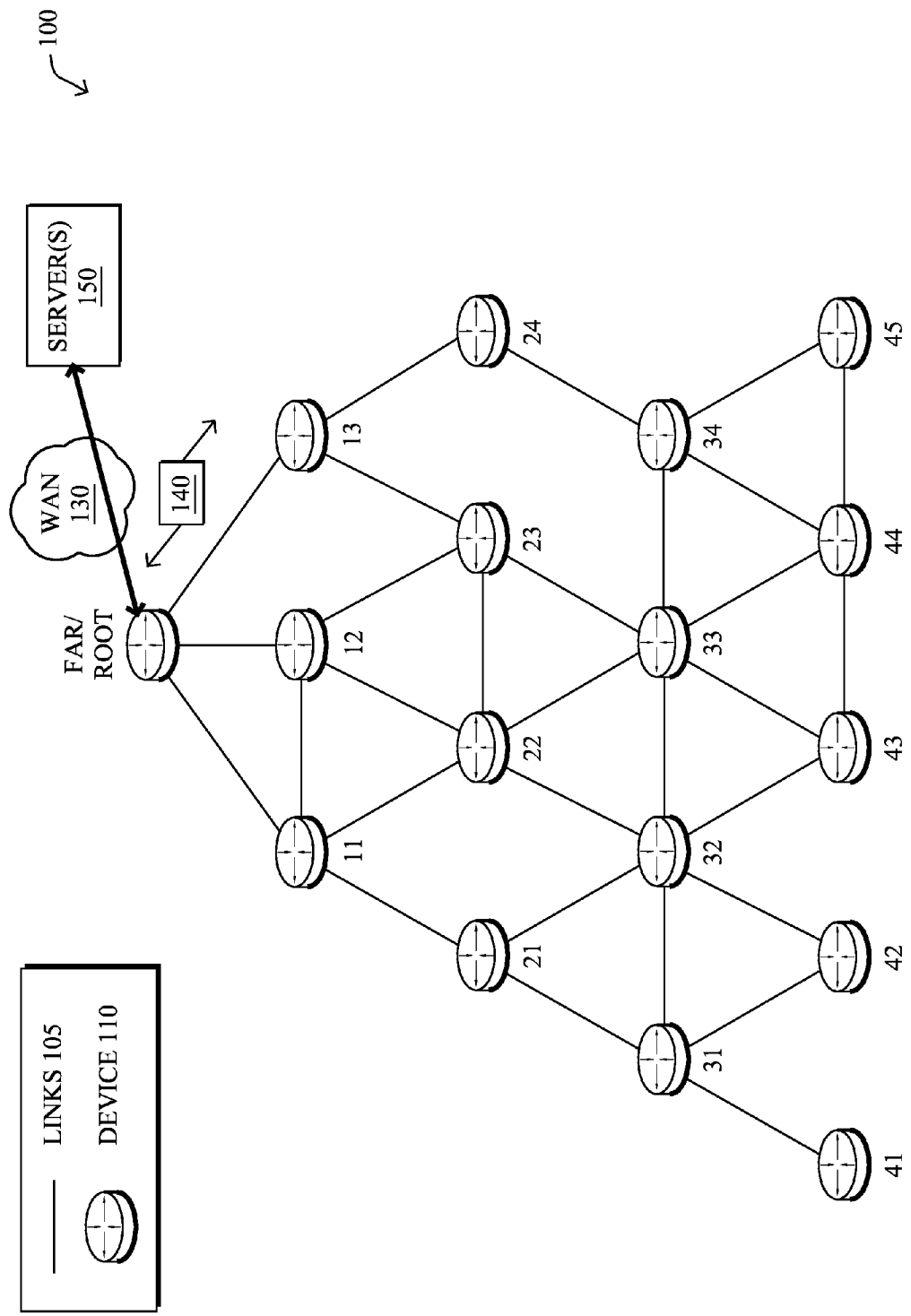
FIG. 1 illustrates an example communication network.

According to one or more embodiments of the disclosure, techniques are shown and described relating to dynamically determining node locations to apply learning machine based network performance improvement. In one embodiment, a degree of significance of nodes in a network, respectively, is calculated based on one or more significance factors. One or more significant nodes are then determined based on the calculated degree of significance. Additionally, a nodal region in the network of deteriorated network health is determined, and the nodal region of deteriorated network health is correlated with a significant node of the one or more significant nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary is topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be is used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
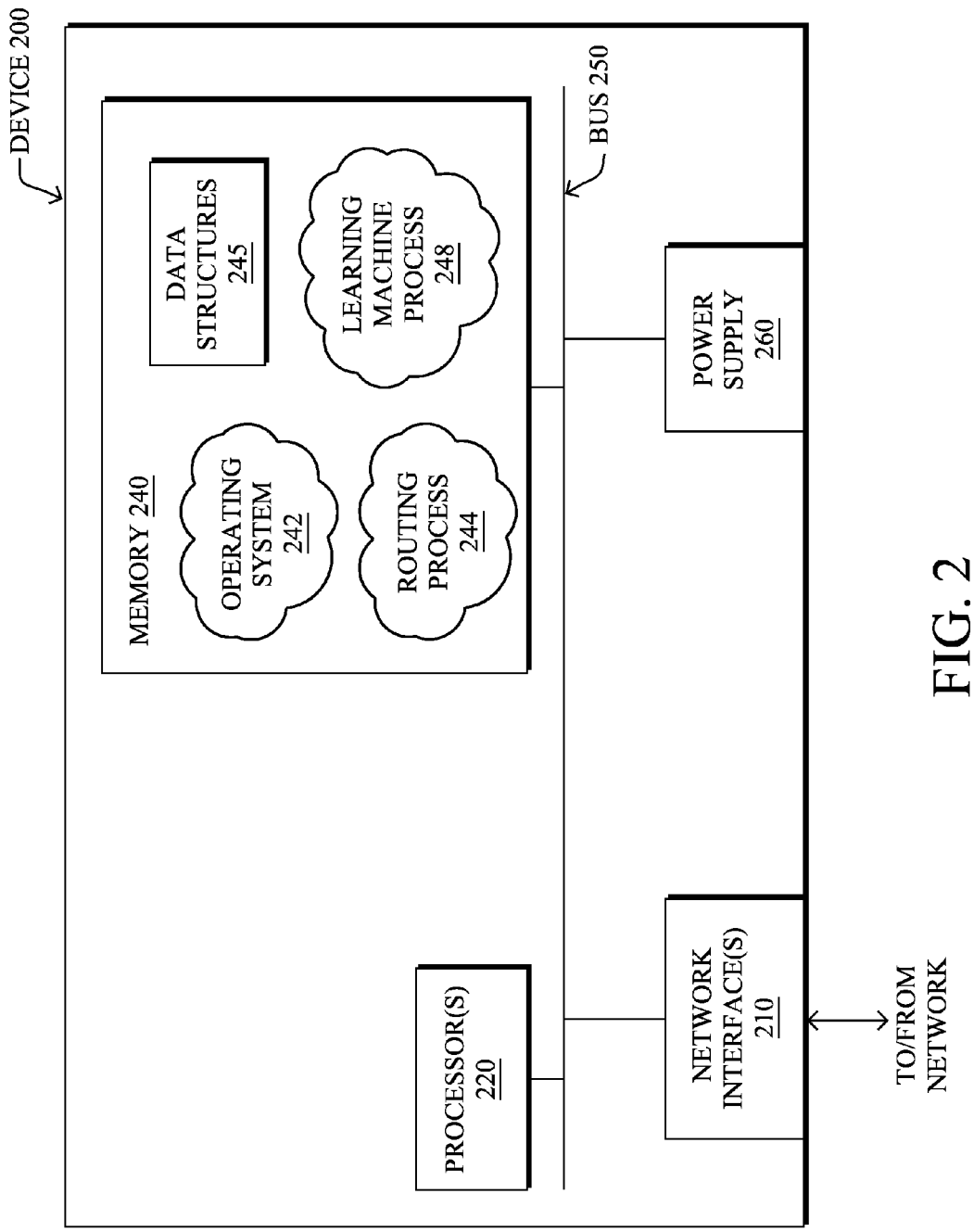
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices is may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
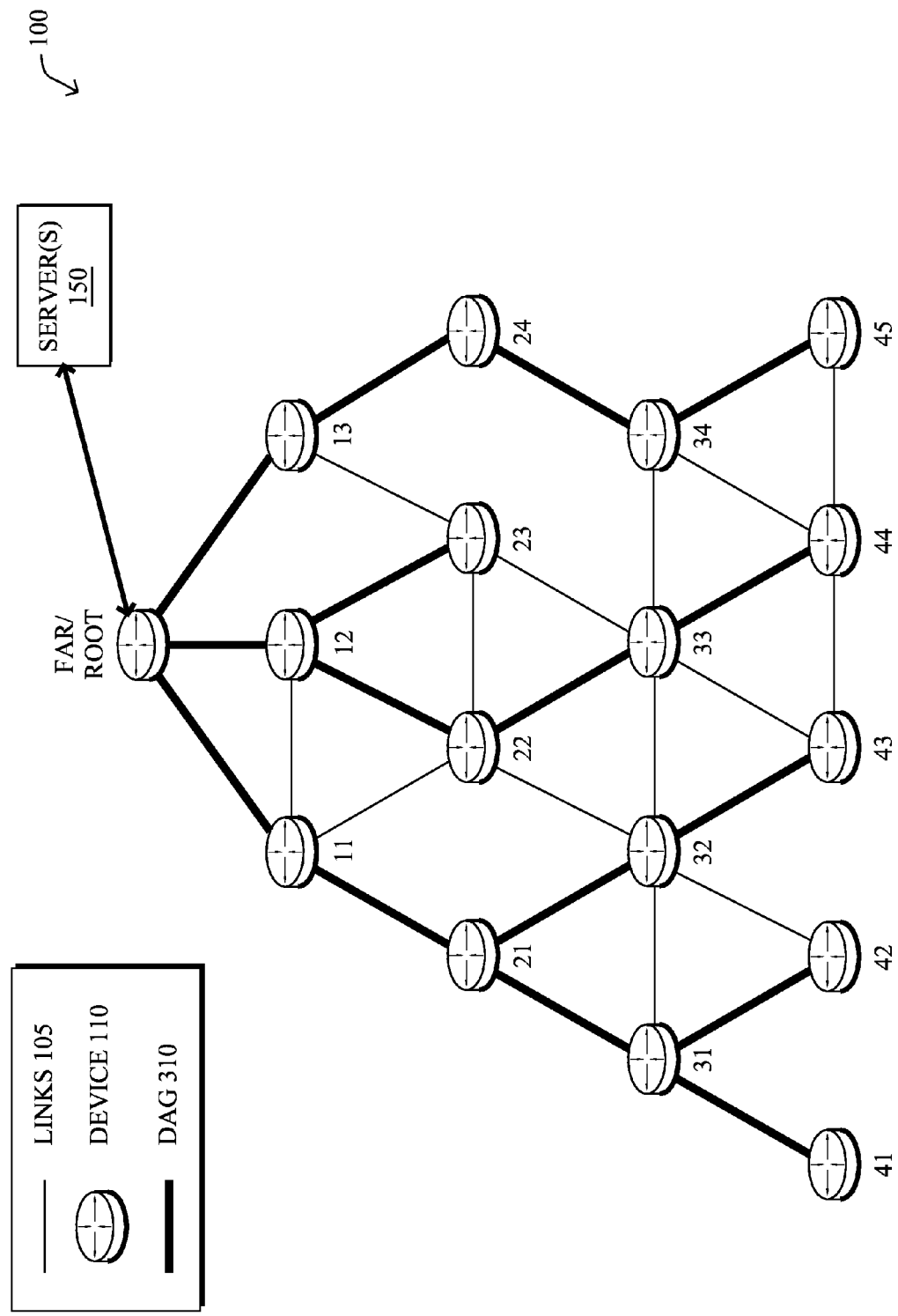
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify is new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

When network health starts to deteriorate in specific sections of an LLN, one of the major requirements is to sample the state of the affected area to determine what remedy to take. This can easily become counter productive as sampling may itself make things worse. It is therefore important to narrow down some specific nodes that may give an accurate representation of all the nodes in the surrounding area and simplify the problem of sampling the network state.

According to the techniques herein, nodes are selected that will likely give an accurate measure of the surrounding network state. Nodes that meet a sequence of "importance criteria" are selected and correlated with the areas where a drop in network health is observed. This then allows the Learning Machine (LM) technique to be used effectively on nodes that are of significance for maximum impact. Notably, the concept of node selection criteria is well known. Commonly deductible characteristics of nodes such as bottleneck location, high in-degree, high rank etc have been used in many closed loop mechanisms. The ideas presented herein, however, involve deeper concepts such as identifying the importance and impact of a node on neighboring nodes and then selecting only those that meet multiple criteria based on various properties that arise from the is relative locational properties of the node.

Said differently, the techniques herein dynamically determine which nodes are of significance when LM mechanisms need to be applied to sub-DAGs to improve the health of the network. An "area of influence" of a node is defined, as well as different criteria that govern this characteristic of a node. The selection mechanism herein uses a combination of geo-location triangulation and sets of nodes with a high area of influence to determine sets of nodes that can be most effective for use by LM mechanisms. This set of nodes can then be further narrowed down based on what the LM mechanism does such as probing, routing control loops, etc.

In one embodiment, a degree of significance of nodes in a network, respectively, is calculated based on one or more significance factors. One or more significant nodes are then determined based on the calculated degree of significance. Additionally, a nodal region in the network of deteriorated network health is determined, and the nodal region of deteriorated network health is correlated with a significant node of the one or more significant nodes.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

As described above, LLN trees/DAGs are built and maintained in real time using is changing ETX values and other links and node metrics. Nodes select the most suitable parent based on various metrics according to an objective function (e.g., more favorable ETX values to their parents, etc.). As a result of this behavior, not all nodes play a significant role in the logical topology that is formed. It is therefore important to determine which nodes play a significant role in the network so that:

a. The characteristics of the relevant nodes are tracked, i.e., nodes that have an impact on the topology;
 b. When health sampling is done (Path ETX, Happiness, stickiness, Rank changes), they will intrinsically be able to give a representation/information of the sub-DAGs below them and the neighborhood.
 c. When Learning Machine (LM) techniques are applied, they are effective in improving the health of the network because they were used with respect to the location of significant nodes.

Operationally, therefore, the techniques herein introduced the term "Area of Influence" of a node to further describe the working principles behind determining significant nodes. As LLNs usually share a common channel, transmissions from surrounding nodes have an impact on the ETX of the node in question. If the node in question is a parent node with several children, the "Area of Influence" of the parent node is quite large and affects a large percentage of the children as they are all trying to communicate with it. It should be noted that an Area of Influence of a node may also be governed by its geographical location with respect to the children. Note that the ETX is chosen for the sake of illustration but the concepts and mechanisms described herein are not limited to the ETX metric.

Figure 4:
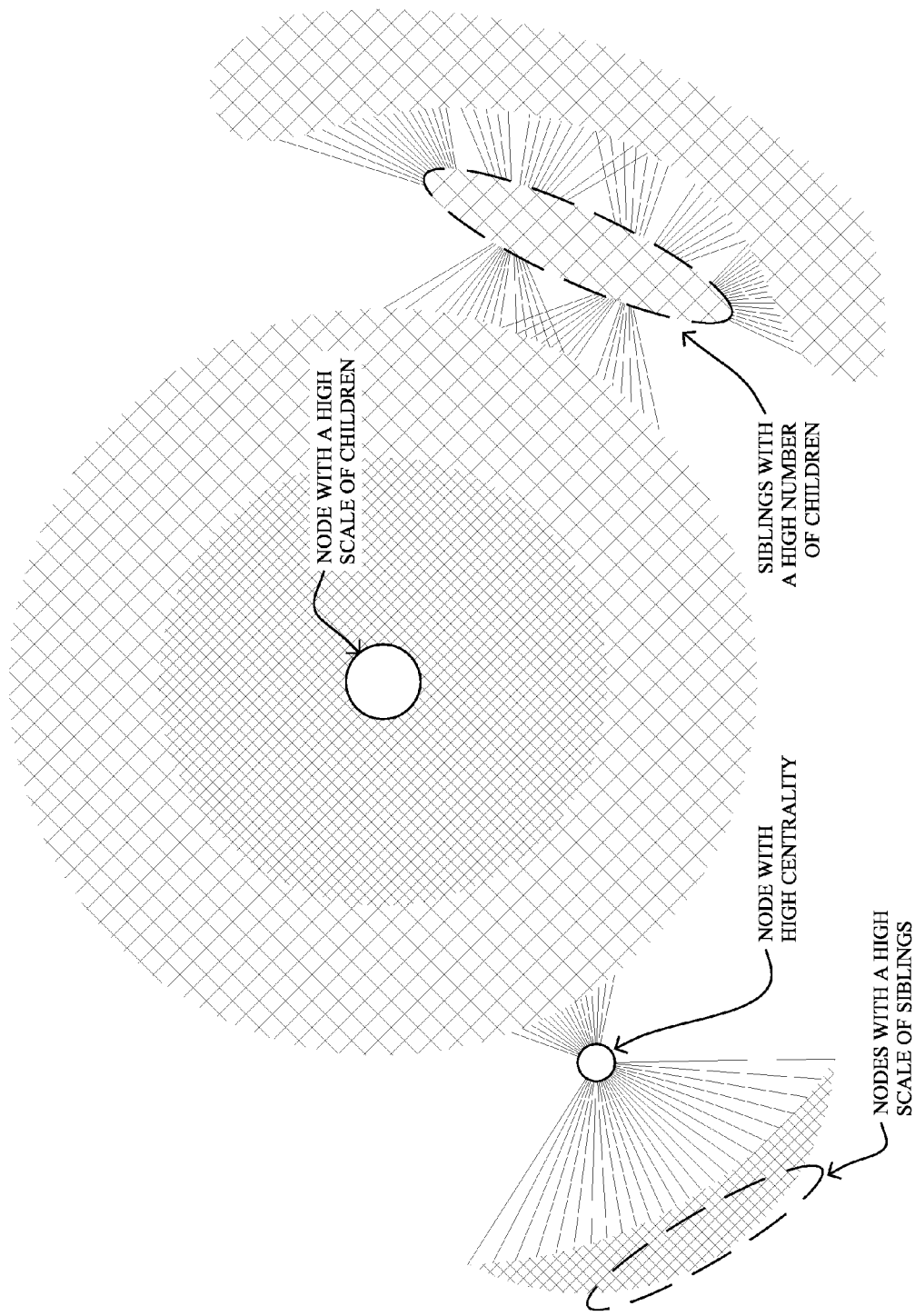
FIG. 4 illustrates an example network representation with different types of nodes having an area of influence.

The techniques herein consist of a number of components to determine a node's significance within the DAG/tree (routing topology in general) using one or more "significance factors." First, the techniques determine an area of influence using the logical location. This component involves determining where the node is with respect to the rest of its surrounding tree, i.e., its children, its parents, and its siblings. Nodes who are leaves and have only a handful of children usually are not very significant and should is generally not be used. Similarly, nodes that have only a few siblings may also be little considered. The primary interest lies is in three types of nodes (generally with reference to FIG. 4, an alternate view of a mesh network):

a. Nodes that have a large number of children: a sub-DAG where a node has a large number of children is referred to as a "cluster" and that particular node is referred to as the "cluster parent". Cluster parents have a large area of influence because many children are always trying to transmit to it and vice versa. It is because of this that QoS in these clusters may become degraded when sudden traffic bursts happen. This in turn also could affect the siblings of the cluster parent as well as the parent of the cluster parent if they are too close physically. Note that should the node run out of power or suffer form congestion the phenomena would be even more greatly exacerbated.
 b. Nodes that have siblings that have a large number of children: This category of nodes doesn't have as large an influence as the previous category but still can affect significant parts of the surrounding network as their transmissions could collide with the large cluster close to them.

c. Nodes that have a large number of siblings: These nodes constantly have to compete with the sibling nodes to get successful transmissions as they share the same parent. This situation is common amongst the nodes close to the FAR for example. This is another indication of the network density (even if the network is not a sibling from a routing standpoint).

For area of influence determination based on logical DAG/tree location, the techniques herein first pick the set of nodes in category "a", then "b" and "c". This may be accomplished using RPL DAG/tree observations or any available information related to the neighborhood over a period of time. Generally, observations should not be based on one snapshot, but over a period of time. As used herein, these sets are denoted as $S_a$, $S_b$, and $S_c$. Notably, the techniques refine these sets with more selection criteria below. Narrowing down to these three sets will generally ensure that the techniques do not need is to gather info from all nodes suffering from issues (QoS or otherwise), but instead have a smaller set that is an accurate representation.

A second component to determine a node's significance within the DAG/tree (routing topology) involves determining an area of influence using centrality. An important aspect of LLNs is the ability to get traffic from the nodes to the root quickly and reliably. Based on the location of a node, it might be a common transit node for the traffic of a very large number of nodes in its sub-DAG. This particularly makes it significant and increases its area of influence. If such a node were to go down, it will affect a large number of nodes. The techniques herein select such nodes i that have centrality $c(i)$ more than a configurable amount x such that $x<<c(i)$. In another embodiment the techniques may also add a constraint of a minimum number of hops to this scenario. Let this set of nodes be $S_d$.

A third component to determine a node's significance within the DAG/tree (routing topology) involves determining an area of influence using path and routing characteristics. Due to the inherent nature of LLNs, many nodes could be continuously flapping between several parent nodes. The techniques herein define flappiness as the number of unique parents selected per unit of time. Similarly, stickiness is defined as the largest percentage of time a node was with the same parent over a time period. When determining the area of influence using these two metrics, the techniques are designed to always pick a node that is not flappy, i.e., its flappiness is lower than a threshold value f. Similarly, they will also pick nodes who are sticky parents, i.e., a large number of nodes n were sticking to it with stickiness greater than a threshold value s. These sets are referred to as sets $S_f$ and $S_s$.

From the above sets, the techniques herein find the intersections in the following way:
1. $S_a$ intersection with $S_d=S_1$;
2. $S_b$ intersection with $S_d=S_2$; and
3. $S_c$ intersection with $S_d=S_3$.

This results in three sets ($S_1$, $S_2$, and $S_3$) that meet the criteria of having a large area of is influence as well as having a large centrality.

Now, the techniques herein may further refine these sets in the following way:
1. $S_1$ intersection with $S_f=S_{f1}$;
2. $S_2$ intersection with $S_f=S_{f2}$; and
3. $S_3$ intersection with $S_f=S_{f3}$.

This results further in three sets of nodes that are not very flappy and as a result, their area of influence is fairly constant.

The techniques herein may even further create three additional sets, but using the set of nodes that are sticky parents:
1. $S_1$ intersection with $S_s=S_{s1}$;
2. $S_2$ intersection with $S_s=S_{s2}$; and
3. $S_3$ intersection with $S_s=S_{s3}$.

This results in three sets of nodes that are used as parents by a high number of nodes.

With these six sets ($S_{f1}$, $S_{f2}$, $S_{f3}$, $S_{s1}$, $S_{s2}$, and $S_{s3}$), the techniques herein proceed to localize nodes geographically according to the deterioration in network health that is being observed by the LM (or the NMS).

A fourth component to determine a node's significance within the DAG/tree (routing topology) involves localizing nodes with high influence using geo-spatial correlation. In particular, the techniques herein may obtain a general geographical area (could be multiple areas) of deteriorating network health by using the geo-coordinates of the nodes that are being affected. Using a pre-determined radius, the techniques herein attempt to find all those nodes that lie within the area from the six sets above. If there are no nodes, the radius may be increase and the locating is retried until some number of nodes are found. Based on an order of priority, e.g., $S_{f1}$ and $S_{s1}$ first, then $S_{f2}$ and $S_{s2}$, and so on, the techniques start probing the nodes in those sets first. Based on a feedback mechanism, if the health of the network doesn't improve after nodes in $S_{f1}$ are probed, is then nodes in $S_{s2}$ are probed and so on. To improve the results of the techniques herein, an optimization could start with the nodes that are common to $S_{f1}$ and $S_{s2}$ and so on.

Notably, in another embodiment, the selection criteria could start with the fourth component, and then categorize all the nodes in a geographical area using the first through third components above.

Figure 5:
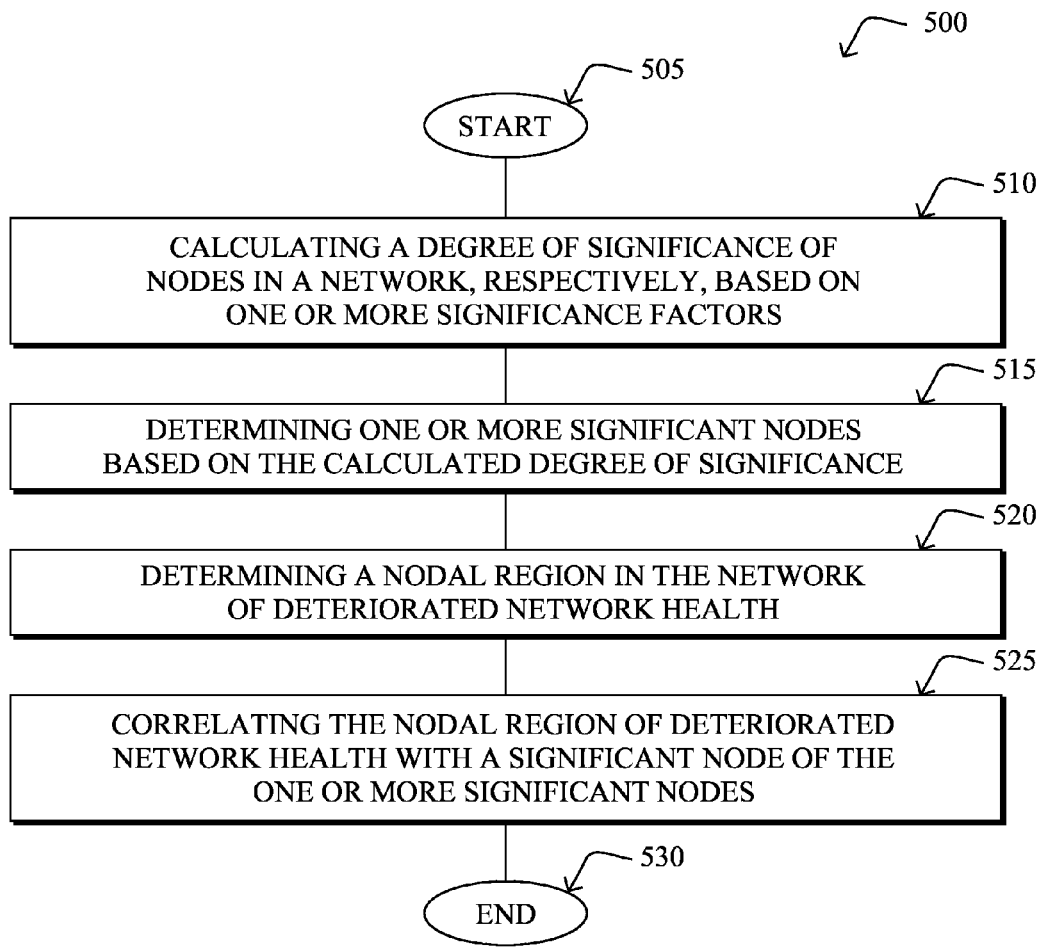
FIG. 5 illustrates an example simplified procedure for dynamically determining node locations to apply learning machine based network performance improvement.

FIG. 5 illustrates an example simplified procedure for dynamically determining node locations to apply learning machine based network performance improvement. As shown in FIG. 5, the procedure 500 may start at step 505, continue to step 510, and so forth, where, as described in greater detail above, one or more significant nodes are determined and correlated with a nodal region of deteriorated network health, e.g., for the purpose of nodal sampling using LM techniques.

At Step 510, the procedure 500 includes calculating a degree of significance of nodes in a network, respectively, based on one or more significance factors. At Step 515, one or more significant nodes is determined based on the calculated degree of significance. At Step 520, a nodal region in the network of deteriorated network health is determined. At Step 525, the nodal region of deteriorated network health is correlated with a significant node of the one or more significant nodes. The procedure illustratively ends at Step 530. The techniques by which the steps of procedure 500 are performed, as well as ancillary procedures and parameters, are described in detail above.

It should be understood that the steps shown in FIG. 5 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for dynamically determining node locations to apply learning machine based network performance improvement. In particular, the techniques herein allow for quick categorization of nodes that have a high impact on their network neighborhood. In addition, based on the several categories (e.g., nodes with high centrality, high children, high flappiness, etc), different types of is mechanisms can be applied to different sets. Furthermore, the techniques herein allow for quickly finding a set of probable nodes that will be effective in mitigating network health issues by correlating geo-coordinates of poor health areas with logical sets of high impact nodes.

While there have been shown and described illustrative embodiments that provide for dynamically determining node locations to apply learning machine based network performance improvement, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   calculating a degree of significance of nodes in a network, respectively, based on one or more significance factors;
   determining one or more significant nodes based on the calculated degree of significance;
   determining a nodal region in the network that has deteriorated network health;
   correlating the nodal region with the one or more significant nodes;
   based on the correlation, identifying one or more significant nodes in the nodal region;
   selecting the identified one or more significant nodes in the nodal region to apply a Learning Machine (LM) technique; and
   in response to selecting the identified one or more significant nodes, applying the LM technique to the selected significant nodes to improve network health of the nodal region.

2. The method according to claim 1, further comprising:
   probing the one or more significant nodes in the nodal region of deteriorated network health to determine a network health thereof; and
   determining network health of the nodal region based on the determined network health of the significant node.

3. The method according to claim 1, wherein the one or more significance factors includes a location-based characteristic defining an amount of nodes surrounding a particular node.

4. The method according to claim 3, wherein the location-based characteristic is selected from a group consisting of: a number of child nodes of the particular node, a number of sibling nodes of the particular node, and a number of child nodes of the number of sibling nodes.

5. The method according to claim 1, wherein the one or more significance factors includes a centrality-based characteristic defining a degree of centrality within the network of a particular node.

6. The method according to claim 1, wherein the one or more significance factors includes a routing-based characteristic defining a degree of transience within the network of a particular node.

7. The method according to claim 6, wherein the routing-based characteristic is selected from a group consisting of: an amount of unique parent nodes over a period of time of the particular node, and an amount of time by which the particular node has a particular parent node.

8. The method according to claim 1, wherein the determining of the one or more significant nodes comprises:
   determining a first node set with a high degree of significance based on one of: a location-based characteristic, a centrality-based characteristic, and a routing-based characteristic;
   determining a second node set with a high degree of significance based on another one of: the location-based characteristic, the centrality-based characteristic, and the routing-based characteristic; and
   calculating an intersection of the first node set and the second node set.

9. The method according to claim 1, wherein the determining of the nodal region of deteriorated network health comprises:
   determining network health of nodes in a network;
   calculating geo-coordinates of a node with deteriorated network health based on results of the network health determination; and
   calculating a nodal region surrounding the node with deteriorated network health, according to a predetermined nodal region size.

10. The method according to claim 9, further comprising:
    determining whether a significant node of the one or more significant nodes resides in the nodal region surrounding the node with deteriorated network health;
    when the significant node resides in the nodal region, correlating the nodal region with the significant node; and
    when the significant node does not reside in the nodal region, increasing the predetermined nodal region size.

11. An apparatus, comprising:
    one or more network interfaces that communicate with a network;
    a processor coupled to the one or more network interfaces and configured to execute a process; and
    a memory configured to store program instructions which contain the process executable by the processor, the process comprising:
       calculating a degree of significance of nodes in the network, respectively, based on one or more significance factors;

determining one or more significant nodes based on the calculated degree of significance;

determining a nodal region in the network that has deteriorated network health;

correlating the nodal region with the one or more significant nodes;

based on the correlation, identifying one or more significant nodes in the nodal region;

selecting the identified one or more significant nodes in the nodal region to apply a Learning Machine (LM) technique; and in response to selecting the identified one or more significant nodes, applying the LM technique to the selected significant nodes to improve network health of the nodal region.

12. The apparatus according to claim 11, wherein the process further comprises:

probing the one or more significant nodes in the nodal region of deteriorated network health to determine a network health thereof; and determining the network health of the nodal region based on the determined network health of the significant node.

13. The apparatus according to claim 11, wherein the one or more significance factors includes a location-based characteristic defining an amount of nodes surrounding a particular node.

14. The apparatus according to claim 13, wherein the location-based characteristic is selected from a group consisting of: a number of child nodes of the particular node, a number of sibling nodes of the particular node, and a number of child nodes of the number of sibling nodes.

15. The apparatus according to claim 11, wherein the one or more significance factors includes a centrality-based characteristic defining a degree of centrality within the network of a particular node.

16. The apparatus according to claim 11, wherein the one or more significance factors includes a routing-based characteristic defining a degree of transience within the network of a particular node.

17. The apparatus according to claim 16, wherein the routing-based characteristic is selected from a group consisting of: an amount of unique parent nodes over a period of time of the particular node, and an amount of time by which the particular node has a particular parent node.

18. The apparatus according to claim 11, wherein the determining of the one or more significant nodes comprises:

determining a first node set with a high degree of significance based on one of: a location-based characteristic, a centrality-based characteristic, and a routing-based characteristic;

determining a second node set with a high degree of significance based on another one of: the location-based characteristic, the centrality-based characteristic, and the routing-based characteristic; and calculating an intersection of the first node set and the second node set.

19. The apparatus according to claim 11, wherein the determining of the nodal region of deteriorated network health comprises:

determining network health of nodes in a network;

calculating geo-coordinates of a node with deteriorated network health based on results of the network health determination; and calculating a nodal region surrounding the node with deteriorated network health, according to a predetermined nodal region size.

20. The apparatus according to claim 19, wherein the process further comprises:

determining whether a significant node of the one or more significant nodes resides in the nodal region surrounding the node with deteriorated network health;

when the significant node resides in the nodal region, correlating the nodal region with the significant node; and when the significant node does not reside in the nodal region, increasing the predetermined nodal region size.

21. A tangible non-transitory computer readable medium storing program instructions that cause a computer to execute a process, the process comprising:

calculating a degree of significance of nodes in a network, respectively, based on one or more significance factors;

determining one or more significant nodes based on the calculated degree of significance;

determining a nodal region in the network that has deteriorated network health;

correlating the nodal region with the one or more significant nodes;

based on the correlation, identifying one or more significant nodes in the nodal region;

selecting the identified one or more significant nodes in the nodal region to apply a Learning Machine (LM) technique; and in response to selecting the identified one or more significant nodes, applying the LM technique to the selected significant nodes to improve network health of the nodal region.

* * * * *

UNITED STATES PATENT AND TRADEMARK OFFICE
CERTIFICATE OF CORRECTION

PATENT NO. : 9,553,772 B2
APPLICATION NO. : 13/946227
DATED : January 24, 2017
INVENTOR(S) : Sukrit Dasgupta et al.

Page 1 of 2

It is certified that error appears in the above-identified patent and that said Letters Patent is hereby corrected as shown below:

In the Specification

Column 1, Line 28, please amend as shown:
memory and/or processing capability, etc. The challenging Column 1, Line 60, please amend as shown:
M is a statistical model, and the cost function is inversely Column 3, Line 6, please amend as shown:
an arbitrary topology.

Column 3, Line 47, please amend as shown:
that any number of nodes, devices, links, etc. may be used Column 4, Line 21, please amend as shown:
herein. Note that certain devices may have limited Column 4, Line 62, please amend as shown:
routing, connectivity is discovered and known prior to Column 6, Line 59, please amend as shown:
easily to classify new data points. Often, M is a statistical Column 7, Line 33, please amend as shown:
various properties that arise from the relative locational Column 8, Line 7, please amend as shown:
tained in real time using changing ETX values and other Signed and Sealed this
Eighth Day of December, 2020

Andrei Iancu
*Director of the United States Patent and Trademark Office*

CERTIFICATE OF CORRECTION (continued)
U.S. Pat. No. 9,553,772 B2

Column 8, Line 17, please amend as shown:
b. When health sampling is done (Path ETX, flappiness, Column 8, Line 47, please amend as shown:
of children usually are not very significant and should Column 9, Line 22, please amend as shown:
ensure that the techniques do not need to gather info from Column 9, Line 57, please amend as shown:
1. $S_a$ intersection with $S_d = S_1$;

Column 9, Line 61, please amend as shown:
of having a large area of influence as well as having a large Column 9, Line 30, please amend as shown:
doesn't improve after nodes in $S_{fl}$ are probed, then nodes Column 11, Line 6, please amend as shown:
etc), different types of mechanisms can be applied to Column 12, Line 1, please amend as shown:
determining the network health of the nodal region based on